United States Patent [19]
MacKelvie

[11] Patent Number: 6,022,474
[45] Date of Patent: Feb. 8, 2000

[54] WASTEWATER SEPARATOR

[76] Inventor: Winston R. MacKelvie, P.O. Box 1156, Knowlton, Canada, J0E 1V0

[21] Appl. No.: 09/017,339

[22] Filed: Feb. 2, 1998

Related U.S. Application Data

[63] Continuation-in-part of application No. 08/027,290, Mar. 5, 1993.

[51] Int. Cl.[7] .............................. B01D 29/35; B01D 39/14

[52] U.S. Cl. ............................................ 210/170; 210/498

[58] Field of Search ...................................... 210/175, 176, 210/179, 181, 183, 187, 86, 774, 170, 498, 319, 320, 457

[56] References Cited

U.S. PATENT DOCUMENTS

| | | | |
|---|---|---|---|
| 2,910,183 | 10/1959 | Hayes | 210/498 |
| 4,885,090 | 12/1989 | Chupka et al. | 210/498 |
| 5,234,550 | 8/1993 | Ekholm et al. | 210/498 |
| 5,407,563 | 4/1995 | Blake | 210/498 |
| 5,736,059 | 4/1998 | MacKelvie | 210/774 |

*Primary Examiner*—Thomas G. Wyse

[57] ABSTRACT

The present invention is a plumbing device for buildings that installs inline with a drainpipe to separates large solids component of wastewater from small solids and liquid components of said wastewater, thereby creating two separate output streams. The second stream of mostly liquid can be directed first to a heat exchanger and then to a sewer or wastewater recycling device. The large solids stream may be directed to a sewer or to a composter

7 Claims, 4 Drawing Sheets

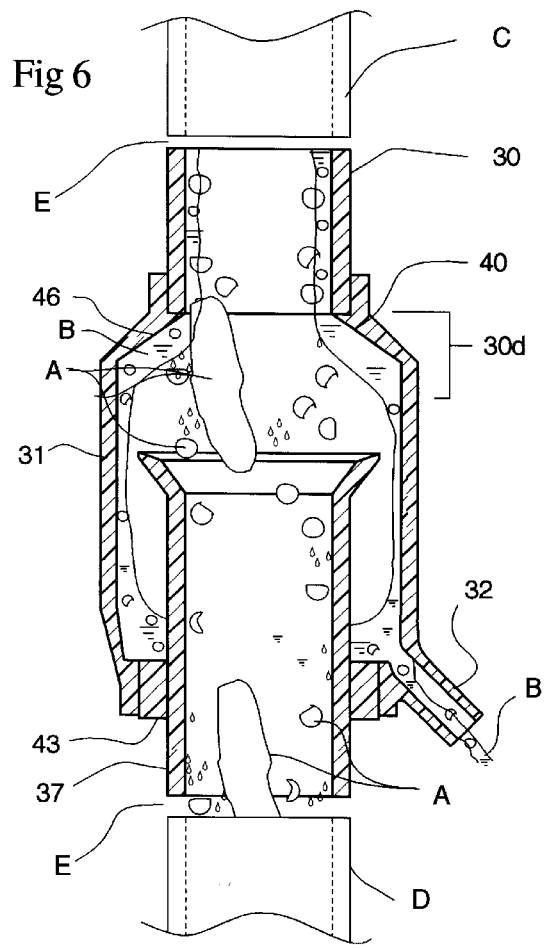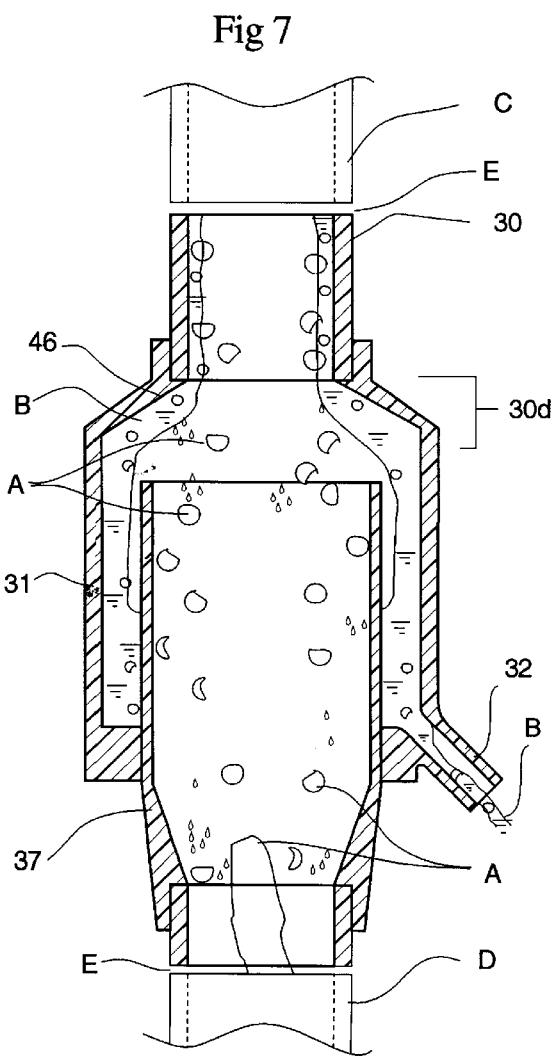

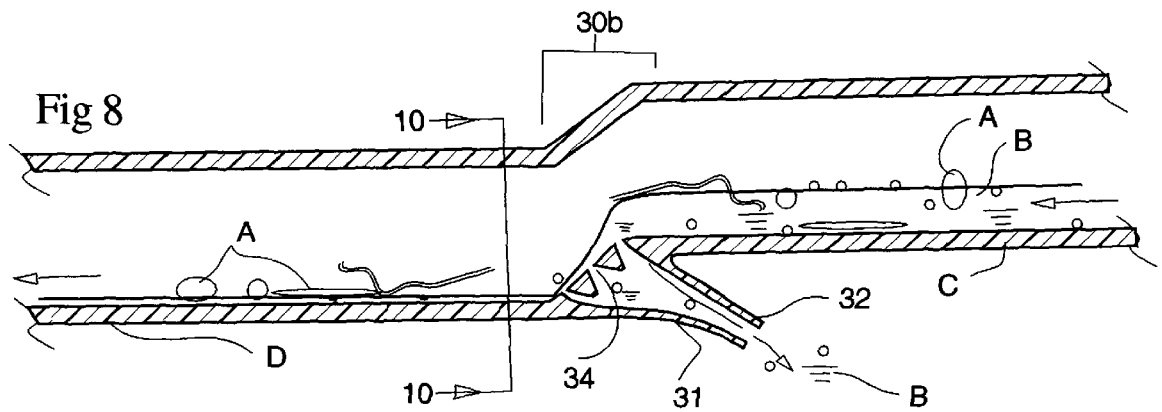
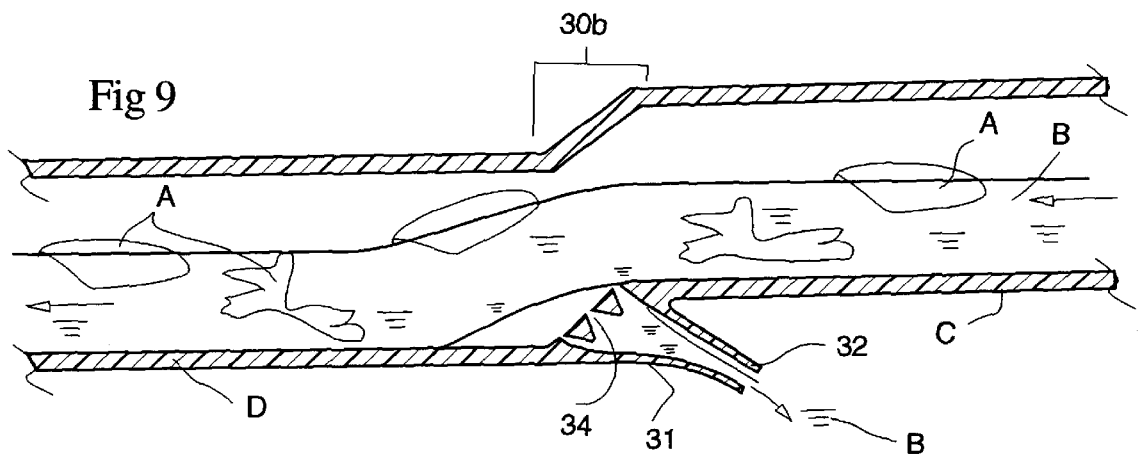
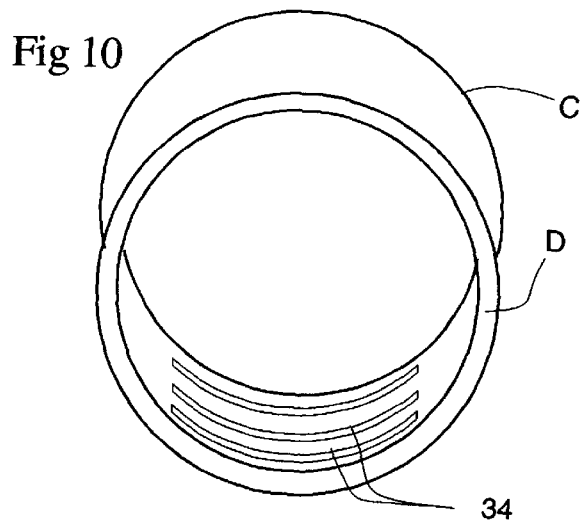

WASTEWATER SEPARATOR

The present application is a continuation-in-part of application Ser. No. 08/027,290 filed Mar. 5, 1993.

FIELD OF THE INVENTION

The present invention pertains to a device installed inline in a drainpipe of any building for the purpose of creating two separate streams of wastewater from a single mixed stream of normal wastewater. In the case of the perforated embodiments, the unique non-blocking holes serve the same function as well known non-blocking wedge-wire filter-separators but at a fraction of the cost and with vertical installation possible.

BACKGROUND OF THE INVENTION

The recovery of heat from the wastewater of buildings has been hampered, at least in part, by the fact of large solids, such as those from the toilet, which prevents wastewater passage through a reasonably sized heat exchanger. This has led to the requirement of replumbing existing buildings to provide separate drain for the toilet. Such costly undertaking, if it in fact can be done at all, i.e., apartment buildings, has prevented widespread recovery of the heat from wastewater. This, in turn, wastes vast amounts of energy which could be used to preheat fresh cold water entering a building's water heater. Moreover the waste of energy contributes to cost of living, pollution and peak period production and distribution costs of energy since hot water is known to be used by the majority of people in a given time zone, for short periods of time at the same time-of-day, i.e., morning, noon and evening.

DISCLOSURE OF THE INVENTION

It is well known that a liquid flowing in a vertical section of a drain pipe, which is a typical configuration, flows in a tubular sheet down the pipe walls, (hollow in the center) and will therefore freely pass through any holes made in the pipe wall.

The present non-blocking solids separator invention comprises, in one embodiment, a first section of drain pipe with a plurality of tapered perforations circumferentially spaced and arranged in a series of parallel rings with plain spaces therebetween. The smaller end of the holes face the pipe interior. Washer-like sloping deflectors are fitted over this first section and attach to the plain spaces between the holes. A second pipe forming a jacket encloses both the first pipe and it's deflectors and is sealed to the top and bottom of said first inner section and is provided with a fitting at it's lower end to connect the separated wastewater to where it is needed, such as a heat exchanger. By this structure only liquid wastewater and smaller particulate can flow out of the drainpipe.

Using tapered holes allows particulates that pass through the hole at the small end to freely continue through the ever increasing cross-section area of the tapered, enlarging hole, eliminating blockage that would occur in plain holes. The deflectors prevent liquid flowing out through holes in the upper portion from re-entering holes lower down.

In a second embodiment of the present invention, the separator is based on a free-fall gap instead of tapered apertures. The first conduit section expands angularly to the inner wall of a second conduit section which forms an enclosing jacket such that the wastewater will naturally flow outwardly by capillary action clinging to the angled path into the jacket and thence to a fitting for connection to the required wastewater appliance. However heavier solids and sludges lacking this surface tension, fall vertically from the wastewater and drop through the gap and enter the third conduit section which connects to the sewer. In this way the desired separation of the liquid from the wastewater occurs.

In a third embodiment the separator is for use in a horizontal drainpipe where the potential of blockage from toilet waste are more severe since the water rush accompanying a flushing toilet is essential to ensure adequate flow for the complete draining of these septic solids. This embodiment has a first conduit section with non-blocking apertures. The apertures are located in a step-change in drainpipe cross-sectional area. The step can be vertical or at an angle and creates a waterfall in the wastewater flow. Toilet flow occurs at flow rates of gallons-per-second as compared to all other plumbing fixture which flow their waste in gallons-per-minute or less. This fast toilet flow has considerable momentum and flows in a trajectory over the step section largely avoiding the tapered apertures in the step section. This ensures full flow rate to prevent blocking in the drainpipe. At all other flow rates, the wastewater containing smaller particles flow down the step and through the non-blocking apertures into the sealed jacket and to a fitting for connection to an appliance. Solids and liquids that do not escape, continue flowing into the toilet flow landing region which carries them to the sewer.

In a fifth embodiment, a flexible fabric/mesh, such as nylon, is used to separate a vertical flow of wastewater. The flexible mesh forms the first conduit section and connects and seals to non-perforated entry and exit portions. As with the other embodiments, an enclosing jacket also seals to these non-mesh portions. This embodiment would depend on the flexing of the fabric/mesh from wastewater turbulence to dislodge blockages. The fabric/mesh may be shaped diamond-like to provide ideal capillary action for the separated wastewater to run through the fabric/mesh and not back in. Such shapes include a conical shape with the wide end facing upstream to encourage the separated wastewater flow to drip off the mesh into the jacket. Another form would include folding ring-like pleats in the fabric/mesh forming vertically spaced, integral deflectors.

In a sixth and preferred embodiment, a first section of drain pipe has a plurality of tapered perforations made at an downwards facing angle to the drainpipe wall. A common countersink will create such holes although an angle of about 45° (included angle, i.e., about 22.5° half angle) has been found to allow more holes each having sufficient taper for non-blocking operation. The smaller end of smaller end of the holes again face the pipe interior. Again, using tapered holes allows liquids and particulates that pass through the hole at the small end to freely continue through the ever increasing cross-section area of the tapered, enlarging hole, eliminating blockage that would occur in plain holes. Making the tapered holes face downwards or downstream prevents liquid flowing out through upper holes, from re-entering drainpipe through lower holes. Again. a second pipe forming a jacket encloses this portion and is provided with a fitting at it's lower end to convey the separated wastewater to where it is needed, such as a heat exchanger.

A seventh embodiment of the present invention uses wedge-shaped slots in place of tapered holes and where the upper outer surface of the wedged slot includes a deflector means. A spiral slot of wedge shaped cross-section could also be used with deflector means being a spiral flange facing the jacket to prevent wastewater from re-entering the spiral slot lower down.

In large buildings such as hotels where wastewater flow increases dramatically at certain times of day, multiple separators for parallel operation can be fitted about the drainpipe offering larger capacity as required. Additionally; such separators may be fitted in series at different vertically spaced intervals to drain off wastewater in stages of allowable solid size, larger solids being allowed to separate with liquid upstream and prevented with smaller apertures downstream. In buildings where each floor may have water heating equipment, a separator may be fitted to the drainpipe on each floor.

For collecting desirable food scraps, a smaller version of the present invention could be fitted upstream in the plumbing system where such waste is generated. For example, under the kitchen sink, a separator would allow food solids, rinsed to the drain, to be collected in a removable container. In this embodiment, the jacket is connected to the regular drain pipe which then can have a second separator downstream for separating the toilet wastes. For separating toilet waste for treatment, a small separator of a kind described above could be incorporated into the toilet body design to cause liquids to drain separately from solids.

BRIEF DESCRIPTION OF THE DRAWINGS

FIG. 6 is a cross section view of a free fall/surface tension embodiment

FIG. 7 is another free falil surface tension embodiment.

FIG. 8 is a horizontal drainpipe embodiment with normal flow.

FIG. 9 shows the same embodiment with toilet flow.

FIG. 10 is an end view of the same embodiment.

The separator embodiments shown FIGS. 1, 2, 3, 4, 5, 6, 7, 11, 12, and 13 are inserted inline at E in a vertical section of the normal drain pipe C from which a suitable section has been removed. The wastewater supply containing liquid component B and solid component A enters the separator 30 as shown in embodiments in FIGS. 1, 2, 3, 4, 5, 11, 12, and 13 and flows down the tubular wall to the perforated section 30a having tapered perforations 34 which provide non-blocking openings for liquid and smaller particulate matter to pass through and collect in jacket 31. In FIG. 11 the perforated section is screen material 30c.

In FIGS. 6 and 7 the separator portion 30 is a tapered entrance 40 to which wall liquid B clings at tapered wall 46. In these embodiments the separated liquid portion B collects in jacket 31 while solids A free fall through to exit portion 37 and back into drainpipe D.

In all embodiments, connection 32 of jacket 31 connects to wherever the separated liquid portion of the wastewater stream is needed, such as a heat recovery device. In FIGS. 12 and 13, is shown the preferred embodiment of the perforated section of a separator comprised of tapered holes 34 which are downwards facing as shown in FIG. 13 where the upper angle 34c is less than lower angle 34d. Downwards facing holes 34 ensures that liquid cannot re-enter a lower hole. These holes can be made at a 15°–20° downward angle from the horizontal with excellent results. This perforated section of course fits inside a sealed jacket such as that shown in FIG. 1. Made of smooth polyethylene, it is also self-cleaning when a rush of wastewater dislodges material which may cling to the surface from time to time. Additionally, a pressure fitting on the side of the jacket may be used to blast this perforated section of FIG. 12 to maintain a free-flowing condition after long periods of use or if a particularly difficult deposit should develop. This perforated portion may also be loosely mounted within the jacket and have vanes attached radially to the outer surface which, under the influence of the aforementioned pressure wash, will cause the section to spin within the jacket providing a very positive method of cleaning gummy deposits from the holes and surface.

In FIGS. 1, 2, 3, 4, 5, and 11 wastewater carrying the small particulate matter that passes through perforations 34 or screen portion 30c are deflected away from the lower rings of holes by deflector rings 33.

Figure 1:
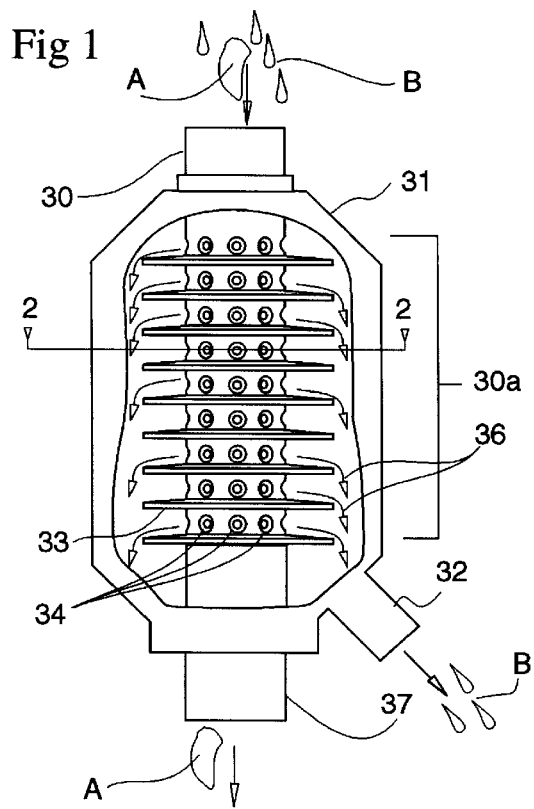
FIGS. 1 shows fragmented view of one embodiment of a wastewater separator.
Figure 4:
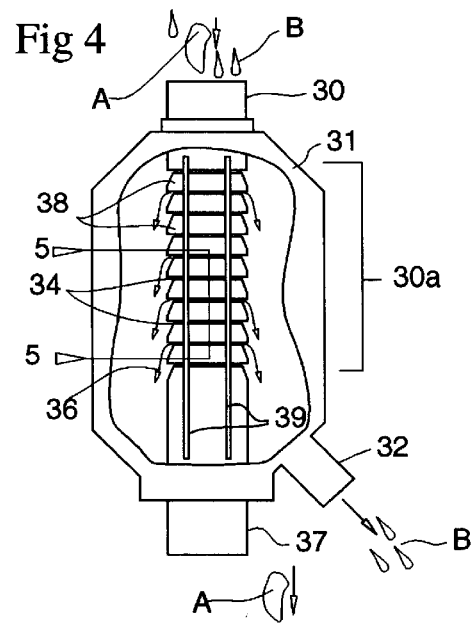
FIG. 4 is a wedge slot embodiment.
Figure 3:
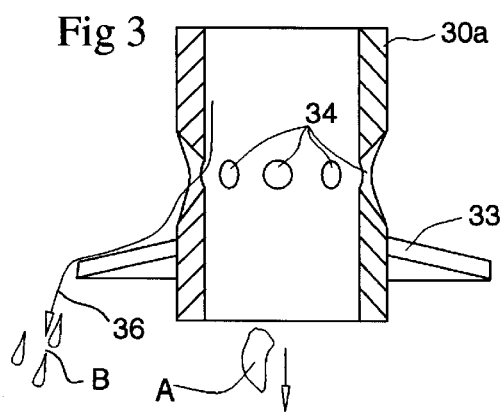
FIG. 3 is a vertical cross section of the same embodiment.
Figure 5:
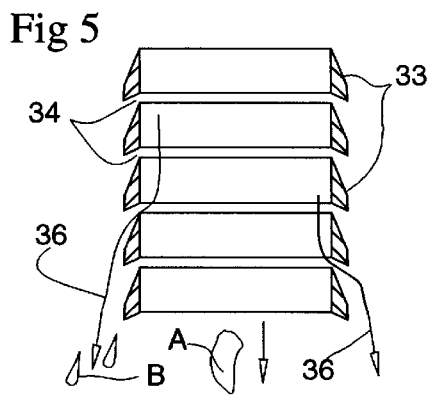
FIG. 5 is a cross section of the same embodiment
Figure 2:
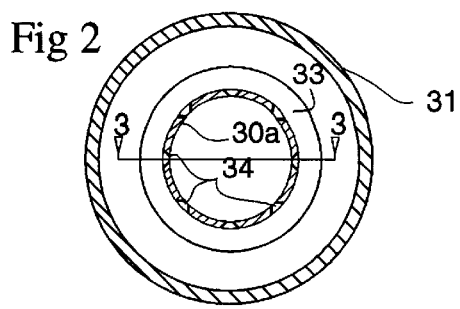
FIG. 2 is a cross section view of 2—2 in FIG. 1.

The embodiment shown in FIGS. 4 and 5 has tapered perforations in the form of circumferential slots formed, for example, by the stacking of discs 38 leaving perforations 34 which are angularly shaped to provide the required features of non-blocking separation. The stacked discs are held in alignment by rods 39 which are bonded, welded or molded to the discs.

Figure 11:
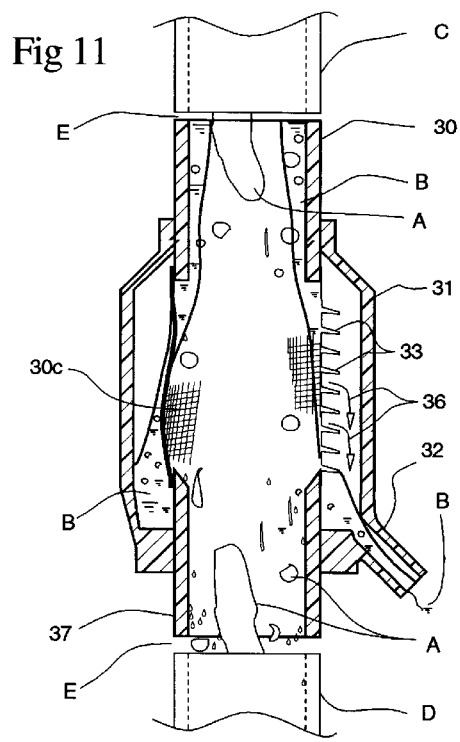
FIG. 11 is a mesh separator embodiment.
Figure 12:
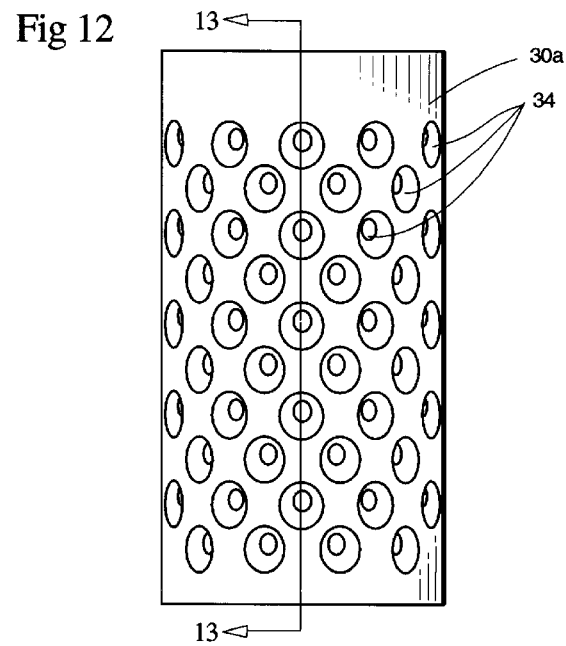
FIG. 12 is the preferred embodiment of the perforated portion of a separator with tapered holes facing downstream.
Figure 13:
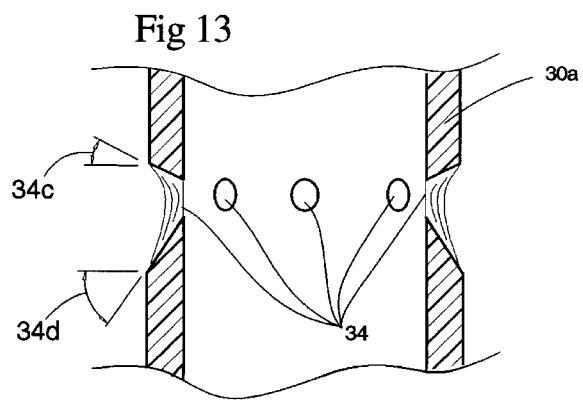
FIG. 13 is a cross section of 13—13 in FIG. 12 of the same embodiment.

In the embodiment shown in FIG. 11 flexible mesh 30c responds to the turbulent flow of wastewater by flexing which will dislodge blockages in the mesh. Additionally, since the wastewater solids are substantially organic, any blockage of the mesh openings will decompose in time and eventually be dislodged by this and by the repeated flexure thereof. On the left side of FIG. 11 is shown a plain tubular form of the mesh while on the right side is shown a variation where pleats 33 are formed in the mesh to form integral deflectors.

In the above embodiments shown in FIGS. 1–5 and 11–13, additional benefits could result from supplying the wastewater to cause a swirling, centrifugal fall of onto the perforated portion 30a. This may be accomplished by the use of a tangential flow, a volute-shaped entry, and/or vanes angularly disposed in the entry section C or in separator portion 30.

Referring again to FIGS. 6 and 7 the area of capillary action 46 allows liquid B to freely flow angularly into jacket 31. Larger solid component A fall by gravity out of the wastewater through gap 30d into enlarged entry to third conduit section 37 whereafter these solids continue directly to the sewer. The angle at area of capillary action 46 determines the size of the solids separation and overall length of the separator. Toilet flush, being of high volume in a short time (high flow rate), will have sufficient momentum to pour through the gap ensuring secure operation of the building's wastewater drainage system. The exit section has provision such as a funnel end in FIG. 6 which requires a filler ring 43 to allow assembly. Another such provision is shown in FIG. 7 where the enlarged end of third conduit section 37 ensure solids drop into it.

FIGS. 8, 9, and 10 show an embodiment of a separator for use in horizontal drainpipes. In FIG. 8 is depicted normal wastewater flow from showers, washers, etc., while FIG. 9 depicts a toilet's high rate of flow. Entry C and exit D provides a vertical step at 30b in the separator. At this step 30b are outwardly tapered apertures 34 over which the wastewater flows. Liquids and small particles escape to outlet fitting 32. It can be seen in FIG. 9 the special case of toilet flow is dealt with by the step which causes the high flow rate to have a trajectory over the step, landing in exit section 37. FIG. 10 is an end view of this embodiment showing the narrow end of the slits that are the outwardly tapered apertures 34. This aperture-containing portion may be a separate piece that could also serve as a connector to couple two plain drainpipe sections C and D.

Although several embodiments of the present invention have been shown and described, it will be apparent that other adaptations and modifications can be made without departing from the true spirit and scope of the invention.

What is claimed is:

1. A system for separating liquid from a liquid containing composition, the system comprising a vercally oriented conduit having a conduit wall surrounding an internal passageway, said conduit wall having an intexior surface and an exterior surface, an inlet to and an outlet from said internal passageway, a plurality of apertures in said conduit wall, an upper wall section and a lower wall section surrounding each aperture, each wall section having an outwardly tapering configuration extending from said interior surface to said exterior surface which that the aperture area on said interior surface of said conduit wall is smaller than the aperture area on said exterior surface of said conduit wall said lower wall section tapering outwardly at an angle with respect to the horizontal which is greater than angle formed by said upper wall section such that liquid flow on said outer surface is substantially prevented from flowing back through said apertures to said internal passageway.

2. The system of claim 1 further including liquid collecting means located below said apertures for collecting liquid flowing outwardly through said apertures from said internal passageway.

3. The system of claim 2 wherein said liquid collecting means comprises a second conduit surrounding said vertically oriented conduit.

4. The system of claim 1 further including deflecting means on said exterior surface of said conduit wall, said deflecting means being located below at least one of said apertures in the direction of fluid flow such that liquid flowing through said at least one of said apertures will be deflected outwardly away from apertures located downstream therefrom.

5. The system of claim 4 wherein said deflecting means comprise deflector rings mounted on said exterior surface of said conduit wall.

6. In a wastewater collection system for a building and wherein there is provided means for recovering heat from said wastewater, the improvement comprising a system for separating liquid from a liquid containing composition, the system comprising a vertically oriented conduit having a conduit wall surrounding an internal passageway, said conduit wall having an interior surface and an exterior surface, an inlet to and an outlet from said internal passageway, a plurality of apertures in said conduit wall, an upper wall section and a lower wall section is surrounding each aperture, each wall section having an outwardly tapering configuration extending from said interior surface to said exterior surface such that the aperture area on said interior surface of said conduit wall is smaller than the aperture area on said exterior surface of said conduit wall, said lower wall section tapering outwardly at an angle with respect to the horizontal which is greater than an angle formed by said upper wall section such that liquid flowing on said outer surface is substantially prevented from flowing back through said apertures to said internal passageway.

7. The improvement of claim 6 further including deflecting means on said exterior surface of said conduit wall, said deflecting means being located below at least one of said apertures in the direction of fluid flow such that liquid flowing through at least one of said apertures will be deflected outwardly away from apertures located downstream therefrom.

\* \* \* \* \*